United States Patent [19]

Kupperman et al.

[11] 4,153,991
[45] May 15, 1979

[54] ABRASIVE HAND COVERING

[75] Inventors: Sam Kupperman, Chicago; Dennis Kupperman, Glenview, both of Ill.

[73] Assignee: Rub-A-Venture, Skokie, Ill.

[21] Appl. No.: 864,825

[22] Filed: Dec. 27, 1977

Related U.S. Application Data

[62] Division of Ser. No. 803,785, Jun. 6, 1977, Pat. No. 4,107,840.

[51] Int. Cl.² .............................................. B24D 11/00
[52] U.S. Cl. ...................................... 30/172; 30/164.9; 51/391
[58] Field of Search ..................... 51/391; 2/161 R; 15/236 R; 30/172, 164.9

[56] References Cited

U.S. PATENT DOCUMENTS

| | | | |
|---|---|---|---|
| 2,895,139 | 7/1959 | Compton | 2/161 R |
| 3,236,553 | 2/1966 | Shrier | 2/161 R |
| 3,566,430 | 3/1971 | Young | 15/236 R |
| 4,038,787 | 8/1977 | Bianchi | 51/391 |
| 4,040,390 | 8/1977 | Rosenbaum | 15/236 R |

*Primary Examiner*—Jimmy C. Peters
*Attorney, Agent, or Firm*—Vogel, Dithmar, Stotland, Stratman & Levy

[57] ABSTRACT

A hand covering or glove having a flexible two-piece body with a plurality of discrete abrading units disposed on the hand covering to permit free flexing thereof. Each abrading unit is a discrete one-piece molded synthetic organic resin member with an abrasive front surface and a smooth rear surface secured to the front piece of the two-piece hand covering. Preferably, the two-piece hand covering is secured at the periphery thereof by heat sealing and the abrading units are also heat sealed to the front piece of the construction.

8 Claims, 9 Drawing Figures

U.S. Patent  May 15, 1979  4,153,991
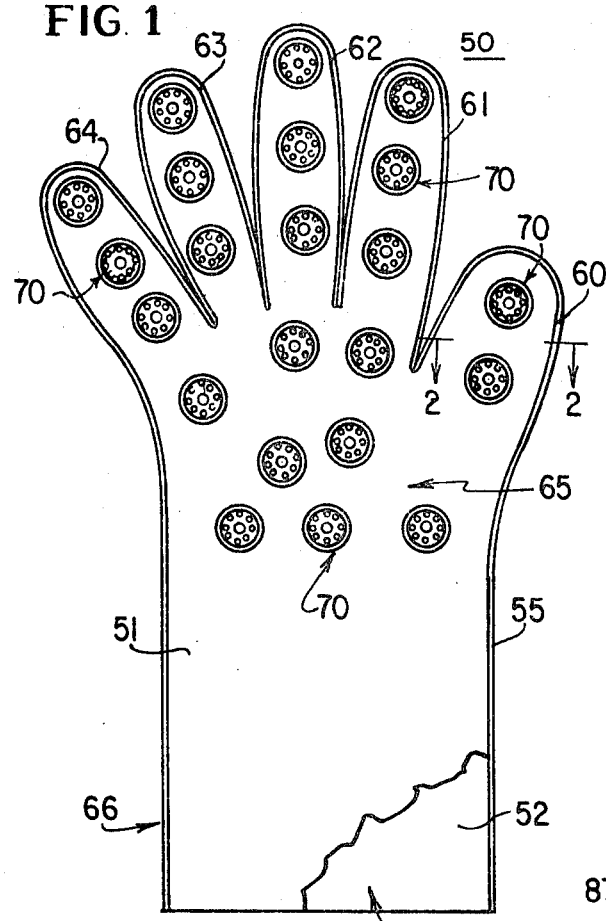
FIG. 1
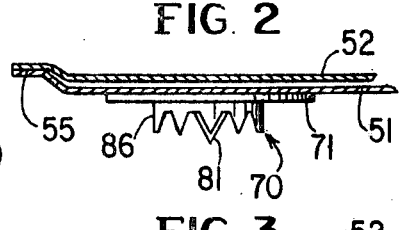
FIG. 2
FIG. 3
FIG. 3A
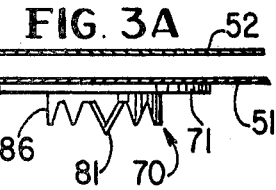
FIG. 4  FIG. 5
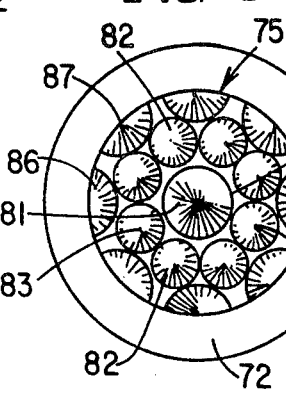
FIG. 6
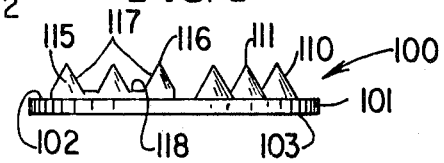
FIG. 7
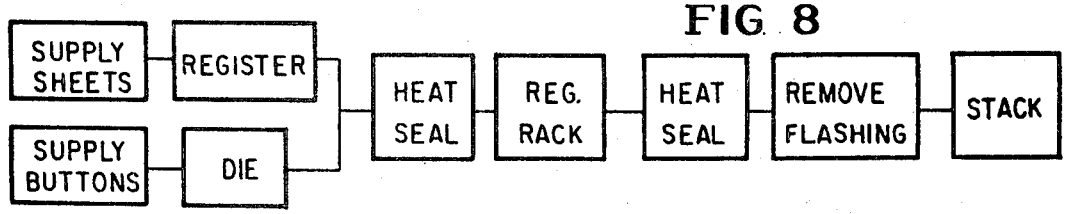
FIG. 8

ABRASIVE HAND COVERING

This is a division of application Ser. No. 803,785, filed June 6, 1977 now U.S. Pat. No. 4,107,840 issued Aug. 22, 1978.

BACKGROUND OF THE INVENTION

Gloves having abrasive material thereon are not in and of themselves new, but each glove which has appeared on the market, for one reason or the other, has not been satisfactory, for both use by the housewife to peel potatoes, carrots and the like, and for heavier duty uses such as abrading paint, scouring pans and the like, while permitting complete flexibility of the glove. Representative of the prior art devices is the glove disclosed in U.S. Pat. No. 2,459,985, issued Jan. 25, 1949 to C. H. Woodbury for HAND COVERING. The Woodbury device shows a glove in which the entire finger, palm and substantially the entire thumb portion of the glove is covered by an abrasive material which while effective to abrade certain objects results in a stiff unwieldy, non-flexible glove and is unsatisfactory for handling smaller items such as carrots, potatoes and the like.

U.S. Pat. No. 3,050,738 issued Aug. 28, 1962 to A. W. Rytina for GLOVE, discloses a glove in which the glove fabric is a mixture of plastisol and elastomer flock dispersed therein. The flock disclosed in the Rytina patent is insufficiently hard and sharp for use in heavy duty jobs such as scouring pots, pans and abrading paint. The Rytina glove like the Woodbury glove is clumsy and relatively inflexible. U.S. Pat. No. 3,643,386 issued Feb. 22, 1972 to Grzyll for ABRASIVE HAND APPAREL, discloses a glove in which insufficient areas are covered with an abrasive material that is itself insufficiently hard and sharp to accommodate all of the jobs necessary in the device of the present invention. The Gryzll patent also discloses a mitten having the abrasive material over substantially the entire working surface, resulting in a cumbersome, non-flexible device much like the Rytina and Woodbury gloves.

U.S. Pat. No. 168,836 granted to H. L. Hall Oct. 19, 1875, discloses a cloth glove having metal plates or disks as discrete abrading units positioned on each of the finger and thumb stalls as well as over the palm of the glove. The Hall patent is difficult to manufacture, and of course, would not be useful in a household function where the user will wet the glove. Providing metal plates or disks through a synthetic organic resin would not be feasible since the resultant hole in the resin would tend to rip under tension resulting in the destruction of the glove. Other prior art devices are cited in the patent application of Albert A. Bianchi, Ser. No. 662,734, filed Mar. 1, 1976 for ABRASIVE GLOVE. However, all of the prior art cited in the Bianchi application as well as the Bianchi application itself, presents problems either with the particulate matter forming the abrasive resulting in a product unsuitable for use with food, such as disclosed in the Bianchi patent, or involves a normal cloth glove with a construction that is not suitable for transfer to a synthetic organic resin or rubber glove.

In order to obviate all of the short comings of the prior art and to provide a two-piece hand covering which is flexible, thereby allowing the user to handle small items, such as potatoes, carrots and other small vegetables, while at the same time being capable of most heavy duty abrading uses, a hand covering or glove has been constructed in which individual discrete abrading units of one-piece molded synthetic organic resin have been secured to the two-piece construction to enable the entire hand covering or glove to be flexible.

SUMMARY OF THE INVENTION

It is a general object of the present invention to provide a two-piece hand covering, method for making same and abrading units for use therewith for abrading large or small objects in which individual one-piece abrading units are positioned to provide adequate abrading areas, while at the same time maintaining flexibility of the hand covering.

A general object of the present invention is to provide a hand covering comprising a two-piece synthetic organic resin construction consisting of a front piece and a back piece sealed to the front piece at the periphery thereof, a plurality of one-piece synthetic organic resin abrading units each having a generally flat rear surface and an abrasive front surface, the rear surface of each of the abrading units being secured to the front piece of the two-piece construction, to provide a two-piece hand covering with a plurality of abrading units thereon.

Another object of the present invention is to provide a two-piece synthetic organic resin hand covering of the type set forth in which the hand covering is a glove and at least one of the two pieces thereof is vacuum formed to a three-dimensional shape simulating a hand having separate thumb and finger stalls.

A further object of the present invention is to provide a method of producing a two-piece hand covering having abrading units thereon, the method comprising providing a supply of pliable sheets of synthetic organic resin, providing a supply of abrading units each having a substantially flat rear surface and an abrasive front surface, sealing the flat rear surface of a plurality of abrading units to one surface of one of the pliable sheets, registering a second pliable sheet to the other surface of the one pliable sheet and sealing the second sheet to the one sheet at the periphery thereof to form a two-piece hand covering having a plurality of abrasive units thereon.

A yet further object of the present invention is to provide a method of the type set forth wherein at least some of the pliable sheets are vacuum formed to provide a hand-like shape having separate thumb and finger portions so that one of the first and second sheets of each two-piece unit is vacuum formed to a three-dimensional shape.

A still further object of the present invention is to provide an abrading unit comprising a rigid synthetic organic resin body having a front surface and a substantially flat rear surface, the front surface having a plurality of discrete rigid cutting means extending therefrom.

Yet another object of the present invention is to provide an abrading unit of the type set forth wherein the cutting means consists essentially of a plurality of cones extending outwardly of the front surface of each abrading unit with at least some of the cones having a different height than others of the cones.

These and other objects of the present invention may be more readily understood by reference to the following specification taken in conjunction with the drawings, in which:

BRIEF SUMMARY OF THE DRAWINGS

FIG. 1 is a plan view partly broken away of the front portion of a hand covering in the shape of a glove showing the placement of each abrading unit thereon;

FIG. 2 is a cross sectional view of the glove shown in FIG. 1 taken along lines 2—2 in which the vacuum formed front and rear pieces are in nesting relationship;

FIG. 3 is a cross sectional view of the glove shown in FIG. 1 taken along lines 2—2 in which the vacuum formed front and rear pieces are in opposed relationship;

FIG. 3A is a cross sectional view of a glove in which the front piece is flat stock and the rear piece is vacuum formed;

FIG. 4 is an enlarged top plan view of an abrading unit illustrated in FIG. 1;

FIG. 5 is an end elevational view of the abrading units disclosed in FIG. 4;

FIG. 6 is a top plan view of an alternate embodiment of an abrading unit for use with a glove of the type shown in FIG. 1;

FIG. 7 is an end elevational view of the abrading unit illustrated in FIG. 6; and FIG. 8 is a schematic flow sheet of a method for making the two-piece hand covering illustrated in FIG. 1.

BRIEF DESCRIPTION OF THE PREFERRED EMBODIMENT

Referring now to the drawings, there is disclosed a two-piece hand covering in the shape of a glove 50 constructed of a front piece 51 and a rear piece 52 in registered relationship and sealed at a seam 55 extending around the entire periphery thereof with the exception of the opening 56. The two-piece glove 50 includes a thumb 60 separate finger stalls 61, 62, 63 and 64, a palm portion 65 and a cuff portion 66.

A plurality of abrading units 70 are strategically placed on the two-piece hand covering, with one abrading unit 70 preferably being placed on each finger section with the abrading units being disposed so as not to cross a joint line. Particularly, there are three abrading units 70 positioned on each finger stall 61, 62, 63 and 64 to coincide with the three sections on each finger. Two abrading units 70 are positioned on the thumb 60 with one abrading unit 70 being near the distal end of the thumb, particularly useful for gouging potato eyes and the other abrading unit 70 being closer to the juncture of the thumb and the palm 65. Three more abrading units 70 are positioned near the pad adjacent the junction of the finger stalls 61, 62, 63 and 64 and the palm 65, with one abrading unit 70 being substantially in registry with the three abrading units on the first or index finger 61 and another abrading unit being located at the pad which is slightly between the second and third fingers 62 and 63 and the final abrading unit being near the pad adjacent the small finger 64. Five additional abrading units 70 are positioned in the palm 65 with three of the units 70 being across the heel of the palm 65 for improved rubbing.

Each abrading unit 70 illustrated in FIG. 1 is identical in construction, but it is apparent that various designs may be intermixed, as preferred. Referring now to FIG. 4, there is disclosed an abrading unit 70 which is circular in plan view with a flat circular base 71 having a front annular surface or flange 72 and a rear substantially flat surface 73. The front annular surface 72 defines an abrading area 75 in its center, which is circular in plan view and contains therein the various abrading or cutting facets. Centrally located is an upstanding cone 80 having an apex 81, which is surrounded by a first row of eight cones 82 each provided with an apex 83. The apex 81 of the central cone 80 extends beyond the apexes 83 of the eight cones 82. Spaced outwardly from the first row of cones 82 is a second row of half cones 86, each provided with an apex 87 and since the cones 86 have been cut in half they are defined by a flat arcuate rear wall 88 with a portion 89 thereof interconnecting adjacent half cones 86. Each of the apexes 81, 83 and 87 is sharp and provides substantial abrasion in use.

Referring now to FIGS. 6 and 7, there is disclosed an alternate embodiment 100 of the abrading unit which is comprised of a flat ovate base 101 having a front ovate flange surface 102 around the periphery thereof and a rear substantially flat surface 103. An oval abrading area 105 is defined by the front ovate flange 102 and contains therein a plurality of cones 110 each having an apex 111. The cones 110 are arranged in three single rows with the cones being substantially contiguous. A plurality of scrapping bars 115 are disposed in the abrading area 105 and extend longitudinally of the abrading unit 100. Each of the scrapping bars 115 is provided with a knife edge 116 at the juncture of upwardly sloping side walls 117, which are interconnected at the base by wall portions 118. The scrapping bars 115 may be interleaved with the rows of cones 110 or may be separate as shown.

The two-part hand construction 50 and more particularly the front piece 51 and the back or rear piece 52 may be made from various synthetic organic resin materials. Acceptable materials, but not an exhaustive list, includes polyvinyl chloride, polyurethane, a combination of latex and polyvinyl chloride, polyethylene and polypropylene. The preferred material is polyvinyl chloride as it is soft and pliable, has a good hand, and is dielectrically heat sealable to provide good seams 55. If polyvinyl chloride is not used and one of the other above-listed materials or equivalents thereof is used, then the seams may be provided by heat sealing, sonic welding or with appropriate adhesives. While dielectric sealing is preferred, since it is a cleaner and faster operation, other alternatives are available.

Each of the abrading units 70 or 100 consists of a one-piece molded chamber. Materials acceptable for the abrading units are in general, rigid or semi-rigid synthetic organic resins, such as polyvinyl chloride, nylon, ABS, polypropylene, polystyrene, or linear polyethylene. The preferred material is a vinyl or particularly a polyvinyl chloride since the abrading units may then be secured to the front piece 51 of the two-piece glove 50 by dielectric heat sealing. If the two-piece glove 50 is fabricated from a material other than a vinyl, then the abrading unit may also be other than a vinyl, since dielectric heat sealing will not ordinarily be possible. Methods of sealing the various synthetic organic resins applicable to the formation of the two-piece glove also applies to sealing the various abrading units to the glove piece.

As disclosed, there are 22 abrading units 70 per two-piece glove 50; however, as few as 12 may be used. If only 12 abrading units 70 are secured to the front piece 51 they would be located as follows, two units per each finger 61-64, three units in the palm 65 and one abrading unit at the distal end of the thumb 60. Still fewer numbers of units 70 may be provided if a larger abrading unit is provided in the palm 65. The principal rubbing action is obtained with the abrading units 70 on the first three fingers 61, 62 and 63, and in the palm area 65. The abrading units on the thumb 60 are principally used to gouge where heavy duty scrapping is required.

The circular shape of the abrading units 70 is preferred, since in fabrication, as will be disclosed, the circular shape contributes to ease of placement and prevents orientation problems. Other shapes acceptable are the elliptical or oval shape disclosed in FIGS. 6 and 7 or rectangular shapes.

The preferred embodiment 70 of the abrading unit includes a circular abrading area 75 containing a plurality of cones 80, 82 and 86. Each abrading unit 70 is a one-piece molded member, whereby no particulate matter forms the abrading unit to lodge in food and the like. The outer wall 88 of the half cones 86 defines the abrading area 75 and in practice is a single unitary wall arcuate in shape and circular in plan view. Each of the half cones 86 has an apex 87 which is sharp to provide good abrading characteristics. The row of cones 82 have bases which abut the bases of the cones 86, the height of the cones 86 and 82 being substantially the same. The central cone 80 extends upwardly beyond the cones 82 and 86 and has a base which abuts or is close to the bases of the cones 82, the base of cone 80 has a larger diameter than those of cones 82 and 86. The draft on each of the cones 80, 82 and 86, prevents food from clogging in the abrading units 70 and provides an important feature of the present invention. The abrading units 70 of the present invention are easy to clean by running under tap water. The peripheral flange 72 accommodates easy heat sealing whether it be sonic welding or dielectric heat sealing of the abrasive unit 70 to the front piece 51. Where an adhesive rather than heat sealing or dielectric sealing is used to secure the abrading units 70 to the glove 50, the flange 72 is not needed.

In the preferred construction, the circular abrading unit 70 has a flange diameter of one-half inch, which increases slightly after sealing. The abrading area 75 is $\frac{3}{8}$" in diameter and the cone heights for each of the cones 82 and 86 is 1/16 of an inch above the surface 72. The center cone 80 has a height of 3/32 of an inch above a surface 72.

The dimensions of the alternate abrading unit 100 would be slightly greater than the abrading unit 70; however, the cones 110 would be approximately the same size as the cones 82. As seen from FIG. 7, the vertical height of both the bars 115 and the cones 110 would be substantially the same as the vertical extent or height of the cones 82.

In lieu of the cones, prisms may be used. Cones however, are easier to mold and provide better draft to facilitate the cleaning of food and other debris from between the abrasive or cutting facets. In lieu of the straight knife edge patterns shown, various herring bone patterns may be used, it being understood that the principal feature of the abrading units 70 and 100 is the one-piece construction having a flat surface on the rear for securing the unit to the front piece 51 of the hand covering 50 and an abrasive surface having cutting facets in a well defined abrading area.

The two-piece hand covering 50 comprising a front piece 51 and a back piece 52 is formed by placing in registry the two pieces and sealing the periphery to form the seam 55. The preferred method of sealing is dielectric heat sealing, which requires that both the front piece 51 and the rear piece 52 be vinyls with polyvinyl chloride being the preferred material. To produce a better looking and easier product to use, at least one of the front pieces 51 and the back pieces 52 should be vacuum formed to form a three-dimensional shape simulating a hand. The depth of the vacuum formed shape varies from about $\frac{1}{8}$" at the finger tips to about $\frac{3}{4}$" across the knuckles to $\frac{1}{2}$" at the cuff portion. The variation in thickness is to accommodate the thickness of a person's hand, which is thickest at the knuckles and thins down at both finger tips and rearwardly of the knuckles. If both the front piece 51 and the rear piece 52 are vacuum formed, then alternate methods of registering the pieces may be used. The section disclosed in FIG. 2 illustrates two vacuum formed pieces 51 and 52 in nesting relationship, whereas FIG. 3 illustrates two vacuum formed pieces 51 and 52 in opposed relationship. The construction illustrated in FIG. 3 most closely resembles a dipped or formed one-piece glove, whereas the construction shown in FIG. 2 is easier to fabricate in high speed processes. It is also comtemplated that only one of the pieces 51 and 52 need be vacuum formed.

Referring now to FIG. 8 of the drawings, there is disclosed a method of making the hand covering 50. A supply of sheets 51 and 52 is provided with at least some of the sheets being vacuum formed depending on whether the construction as shown in FIG. 2 or 3 is to be provided or whether only one of the sheets 51 and 52 is to be vacuum formed. A supply of the abrading units 70 or 100 is provided. A plurality of heat sealing tubes or dies is provided and arranged in the configuration of the abrading units on the hand covering 50. The abrading units 70 are loaded into the dies or tubes with the rear surfaces 73 thereof extending upwardly. A front piece 51 is placed in registry over the set of dies or tubes containing the abrading units 70 and the front piece 51 and a platten is moved to provide pressure between the dies having the abrading units therein and the front piece 51. If the front piece 51 and the abrading unit 70 are both vinyls, then dielectric heat sealing is employed, and this is the preferred method. Thereafter, the rear piece 52 is placed in registry with the front piece 51 and sealed at the periphery thereof, again by heat sealing. If dielectric heat sealing is used, then the sheets 51 and 52 are severely weakened at points along the seam 55, and therefore, an operator may remove the excess of the sheet or flashing by means of tearing the flashing from the formed two-piece hand covering 50. The final operation is to stack the thus formed hand covering 50.

It is clear that different sheets will have to be used for the right and left gloves if both pieces are vacuum formed. If only one piece is vacuum formed, then separate right and left pieces will be needed for the vacuum formed piece, whereas only a common piece is needed for the unvacuum formed flat piece. It is also contemplated that the abrading units 70 and 100 disclosed which are molded in one-piece may also be produced by other methods such as dual durometer extrusion, wherein simultaneous soft and hard plastics are molded and fused with the hard plastics later calendered to form the abrasive surface and the soft plastics forming the support surface to be sealed, to the glove.

Critical features of the present invention reside in the provision of a two-piece hand covering 50. The provision of two-pieces makes the entire production and sale of the item possible. When using a one-piece, formed or dipped glove of the latex type, the required method of fixing abrading units 70 is extremely time consuming and expensive, whereas with the two-piece construction hereinbefore described an economic method of making same has been devised and disclosed herein. By working with only a one sheet or piece 51 when affixing the abrading units 70 and 100 thereon, the entire construction is economical. By providing a vacuum formed piece for at least one of the front and back pieces 51 and 52, a shape similar to a dipped one-piece glove results without the difficulties of adhering or securing the abrading units 70 to the dipped glove. Circular abrading units 70 are preferred since the loading thereof into the heat sealing dies or tubes is facilitated and they may be applied without any particular orientation problems.

The conical shape of the abrasive edges themselves is preferred, since the draft on the cones provides clearance to remove debris when the article is used for scrapping or peeling potatoes, carrots and the like. Smaller units are preferred since they may be strategically placed between joint lines of the hand.

A further critical feature of the present invention is the one-piece molded nature of each abrading unit which completely obviates the problem of loose granular material coming loose and lodging in food causing damage to the consumer. Many of the prior art devices previously described incorporate granular material in one form or the other, all of which may eventually work loose and lodge in food. To this end, the one-piece molded abrading units 70 and 100 are a major advance in the art.

While there has been described what at present is considered to be the preferred embodiment of the present invention, it will be appreciated that various alterations and modifications may be made therein without departing from the true spirit and scope of the present invention and it is intended to cover in the appended claims all such alterations and modifications. For instance, vacuum formed as used herein includes thermal formed and pressure formed.

What is claimed is:

1. An abrading unit comprising a rigid synthetic organic resin body having a front surface and a substantially flat rear surface, said front surface having a plurality of discrete rigid cutting means extending therefrom comprising a central cone surrounded by a plurality of cones lying in concentric loops about said central cone.

2. The abrading unit set forth in claim 1, wherein said cutting means consists essentially of a central cone surrounded by a first ring of eight cones and a second ring of eight half cones.

3. The abrading unit set forth in claim 2, wherein the height of the central cone is greater than the height of the other cones.

4. The abrading unit set forth in claim 1, wherein said cutting means also includes a combination of raised points and knife edges.

5. The abrading unit set forth in claim 1, wherein the abrading unit is circular in plan view.

6. The abrading unit set forth in claim 5, wherein said cutting means form a circle pattern with an annular flange free of cutting means surrounding said cutting means.

7. The abrading unit set forth in claim 1, wherein the abrading unit is oval in plan view.

8. The abrading unit set forth in claim 7, wherein said cutting means form an oval pattern with an ovate flange free of cutting means surrounding said cutting means.

* * * * *